United States Patent
Salsich (10) Patent No.: US 8,373,084 B2
(45) Date of Patent: Feb. 12, 2013

(54) PLASMA CUTTER HAVING HIGH POWER DENSITY

(75) Inventor: Anthony Van Bergen Salsich, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1452 days.

(21) Appl. No.: 11/960,425

(22) Filed: Dec. 19, 2007

(65) Prior Publication Data
US 2009/0159571 A1 Jun. 25, 2009

(51) Int. Cl.
*B23K 10/00* (2006.01)
(52) U.S. Cl. .......... 219/121.36; 219/121.48; 219/121.39
(58) Field of Classification Search ............. 219/121.39, 219/121.44, 121.59, 121.46, 75
See application file for complete search history.

(56) References Cited

U.S. PATENT DOCUMENTS

| | | | |
|---|---|---|---|
| 4,117,527 A | 9/1978 | Demarest | |
| 4,251,764 A | 2/1981 | Mathews | |
| 4,410,788 A | 10/1983 | Summers et al. | |
| 4,453,073 A | 6/1984 | Bredenkamp | |
| 4,785,149 A | 11/1988 | Gilliland | |
| 4,918,285 A | 4/1990 | Thommes | |
| 4,943,699 A | 7/1990 | Thommes | |
| 5,043,554 A | 8/1991 | Kohsaka et al. | |
| 5,086,205 A | 2/1992 | Thommes | |
| 5,290,995 A | 3/1994 | Higgins et al. | |
| 5,726,416 A | 3/1998 | Katooka et al. | |
| 5,990,446 A | 11/1999 | Zhang et al. | |
| 5,994,675 A | 11/1999 | Bethune et al. | |
| 6,057,524 A | 5/2000 | Katooka et al. | |
| 6,087,922 A | 7/2000 | Smith | |
| 6,130,398 A | 10/2000 | Schneider et al. | |
| 6,194,682 B1 | 2/2001 | Schneider et al. | |
| 6,313,431 B1 | 11/2001 | Schneider et al. | |
| 6,339,320 B1 | 1/2002 | Spremo et al. | |
| 6,365,868 B1 | 4/2002 | Borowy et al. | |
| 6,444,944 B2 * | 9/2002 | Schneider et al. | 219/121.54 |

(Continued)

FOREIGN PATENT DOCUMENTS

| | | |
|---|---|---|
| GB | 2039174 | 7/1980 |
| JP | 02217175 | 8/1990 |

(Continued)

OTHER PUBLICATIONS

U.S. Appl. No. 11/947,762, filed Nov. 29, 2007, Lezner et al.
U.S. Appl. No. 11/960,466, filed Dec. 19, 2007, Salsich et al.
U.S. Appl. No. 11/960,494, filed Dec. 19, 2007, Salsich.

(Continued)

*Primary Examiner* — Mark Paschall
(74) *Attorney, Agent, or Firm* — Fletcher Yoder P.C.

(57) ABSTRACT

Systems and methods are provided for a torch power system having a high power density. In one embodiment, a system is provided that includes a torch power unit having a compressor and power electronics that include one or more power converters, wherein the torch power unit has a power output density of at least 2 watts per cubic inch, 80 watts per pound, or a combination thereof. A power conversion assembly for a torch power unit is provided that includes a single circuit board, a torch power converter mounted on the single circuit board, and a non-torch power converter mounted on the single circuit board. An electrical torch system is also provided that includes a circuit board and a power converter coupled to the circuit board, wherein the power converter includes a planar transformer, a foil wound transformer, or a combination thereof.

25 Claims, 4 Drawing Sheets

U.S. PATENT DOCUMENTS

| | | |
|---|---|---|
| 6,570,129 B1 | 5/2003 | Samodell |
| 7,547,861 B2 | 6/2009 | Jorgensen |
| 2001/0042736 A1* | 11/2001 | Schneider et al. ....... 219/121.55 |
| 2004/0031776 A1 | 2/2004 | Gevelber et al. |
| 2004/0069752 A1* | 4/2004 | Ulrich et al. ............. 219/121.39 |
| 2005/0155959 A1 | 7/2005 | Bender et al. |
| 2006/0076330 A1 | 4/2006 | Beistle et al. |
| 2006/0289492 A1 | 12/2006 | Thomas et al. |
| 2006/0289495 A1 | 12/2006 | Thomas et al. |
| 2007/0297154 A1* | 12/2007 | Caruba ......................... 361/760 |
| 2008/0023449 A1* | 1/2008 | Salsich et al. ............ 219/121.44 |
| 2008/0023451 A1 | 1/2008 | Salsich et al. |
| 2008/0061040 A1* | 3/2008 | Sanders et al. ........... 219/121.48 |

FOREIGN PATENT DOCUMENTS

| | | |
|---|---|---|
| JP | 10109166 | 4/1998 |
| WO | 9422198 A1 | 9/1994 |
| WO | WO2006035329 | 4/2006 |

OTHER PUBLICATIONS

U.S. Appl. No. 11/960,514, filed Dec. 19, 2007, Salsich et al.
Millerwelds; Owner's Manual entitled "Spectrum 125C and ICE-12C Torch;" www.millerwelds.com/om/o2248e_mil.pdf; 32 pages.
Millerwelds; Article entitled "Spectrum 125C—The Power of Blue;" issued Mar. 2007; Index No. PC/13.0; www.millerselds.com/pdf/spec_sheets/PC13-0.pdf; 4 pages.

* cited by examiner

PLASMA CUTTER HAVING HIGH POWER DENSITY

BACKGROUND

The invention relates generally to metal cutting and welding systems, and more particularly to portable power units for such systems.

Some torch systems, such as a plasma cutting system, use plasma (e.g., high temperature ionized gas) to cut metal or other electrically conductive material. In general, an electrical arc converts a gas (e.g., compressed air) into plasma, which is sufficiently hot to melt the work piece while the pressure of the gas blows away the molten metal. The power output and flow of the gas can affect the performance of the system.

Such plasma cutting systems may be portable and only require a power source for operation. As portable plasma cutting systems become smaller and less costly to manufacture, such plasma cutting systems may be targeted at the consumer market. However, such systems must provide a relativity high level of power output yet still maintain the portability necessary for the consumer market. Typically, the power converters and other devices used in the systems may include a number of components externally mounted to each other. Additionally, the use and configuration of these components may result in relatively low switching frequencies and low power densities. Further, these converters and other devices may add weight, size, and cost to the plasma cutting system.

BRIEF DESCRIPTION

In one embodiment, a system is provided that includes a torch power unit. The torch power unit includes a compressor, and power electronics comprising one or more power converters, wherein the torch power unit has a power output density of at least 2 watts per cubic inch, 80 watts per pound, or a combination thereof.

In another embodiment, a power conversion assembly for a torch power unit is provided that includes a single circuit board, a torch power converter mounted on the single circuit board, and a non-torch power converter mounted on the single circuit board.

In another embodiment, an electrical torch system is provided that includes a circuit board and a power converter coupled to the circuit board, wherein the power converter comprises a planar transformer, a foil wound transformer, or a combination thereof.

An embodiment is provided that includes a method of operating a torch system. The method includes outputting a peak power density of greater than 2 watts per cubic inch, 80 watts per pound, or a combination thereof, from a torch power unit having a compressor, a motor coupled to the compressor, and power electronics all disposed in a common enclosure.

In yet another embodiment, a method of manufacturing a torch system is provided that includes integrating torch power electronics and compressor power electronics onto a single circuit board and coupling a planar transformer, a foil-wound transformer, or a combination thereof, to the single circuit board for power conversion in both the torch power electronics and the compressor power electronics.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
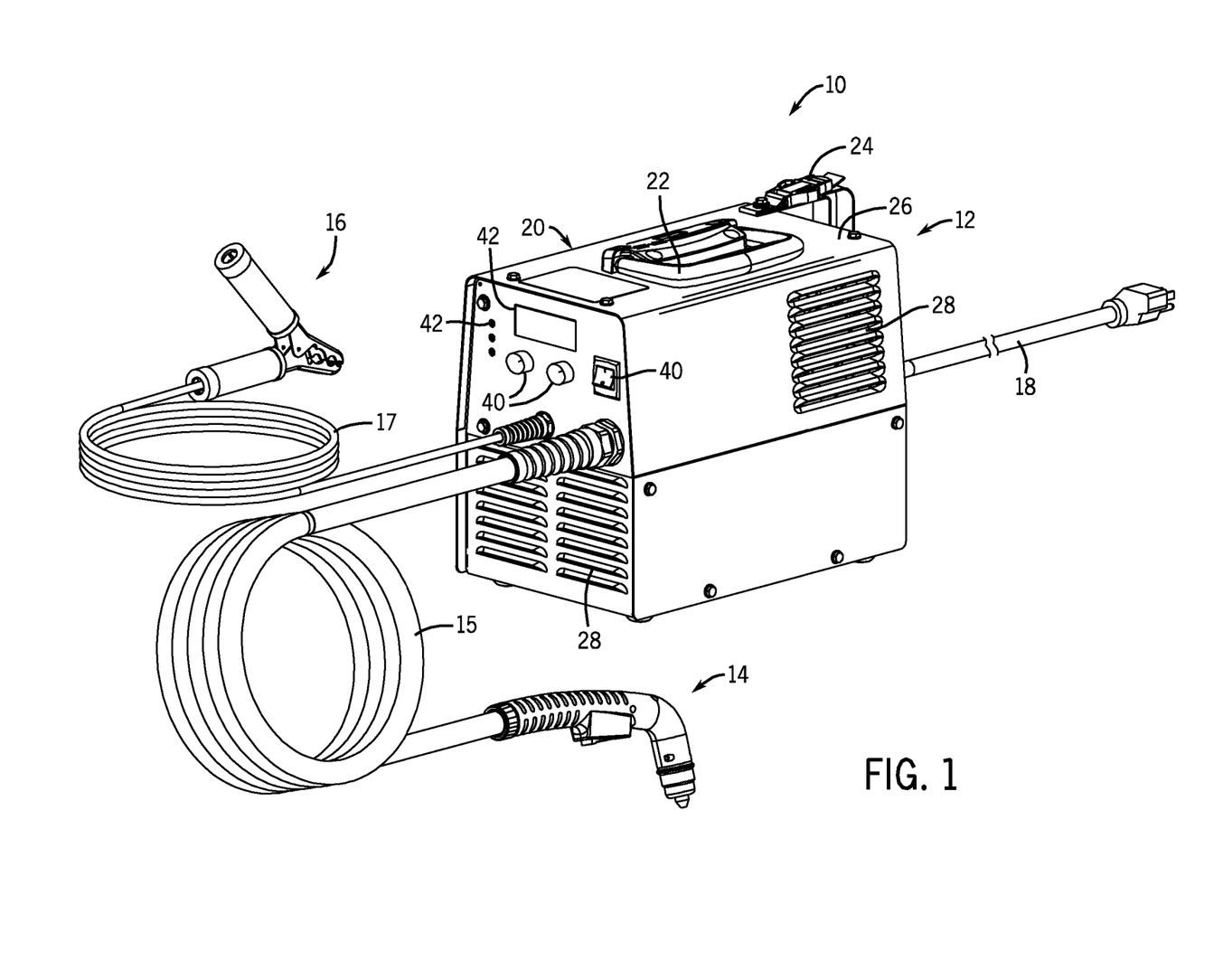
FIG. 1 is a partial perspective view of an exemplary plasma cutting system having a high power density in accordance with embodiments of the present invention.
Figure 2:
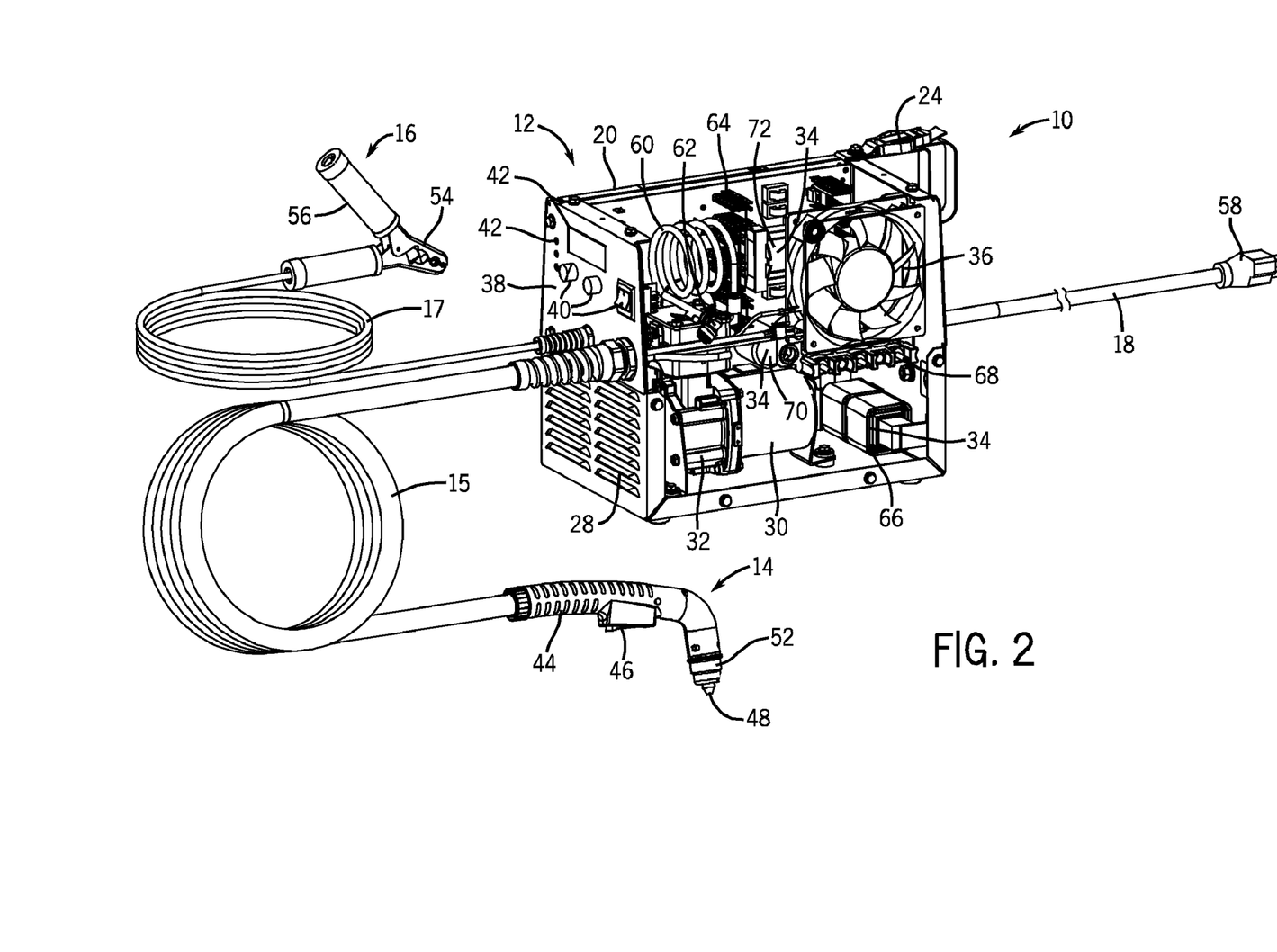
FIG. 2 is another partial perspective view of the plasma cutting system as illustrated in FIG. 1, wherein an entire side panel assembly is removed to further illustrate various internal features in accordance with embodiments of the present invention.

Referring now to the drawings, FIGS. 1 and 2 are partial perspective views illustrating an embodiment of a portable plasma cutting system 10 having a high power density. For example, one embodiment of the system 10 has 2.6 W per cubic inch and 103.4 W per pound. The system 10 may include high-frequency (e.g., greater than 200 kHz) power converters, foil wound transformers, and/or planar transformers to achieve such high power densities. Specifically, FIG. 1 illustrates the system 10 with access panels completely assembled to close internal components, whereas FIG. 2 illustrates an entire side panel assembly removed to provide a better view of the internal features and components of the system 10. As discussed in further detail below, embodiments of the system 10 may include a printed circuit board (PCB) having components for a main power converter and a motor power converter mounted to the PCB.

The illustrated plasma cutting system 10 includes a torch power unit 12 coupled to a plasma torch 14 and a work piece clamp 16 via a torch cable 15 and a work piece cable 17, respectively. The torch power unit 12 may be coupled to a power source (e.g., a power grid or a motor-driven generator) via a power cable 18. The power source may provide a pilot current to a cathode, such as a movable electrode, and to the anode, such as the nozzle of the torch 14, that are forced into contact via a spring. After electrical current begins to flow from the electrode to the nozzle of the torch 14, gas or air supplied to the torch 14 counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created. The plasma jet causes the arc to transfer (at least in part) to the work piece held by the clamp 16, thus initiating cutting. Electronics in the power source sense when the arc has transferred and then supply a main cutting current of greater amperage after the transfer has occurred. Also, the tip of the torch 14 is disconnected (electrically), interrupting the pilot current path. Thus, the current is used to cut the work piece, and follows a path including the positive terminal, the work piece and the electrode. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12. In alternate embodiments, a non-moving electrode torch may be used in which a pilot arc is created via a high voltage and/or high frequency circuit, so that the high voltage may cause the arc to jump from the non-moving electrode to the nozzle. In yet other embodiments, any suitable torch and starting technique may be used.

The power unit 12 includes an enclosure 20 defining a generally closed volume to support various circuits, sensor features, control features, and gas supply features (e.g., air compressor). As discussed in detail below, the illustrated system 10 includes a variety of features to improve portability, serviceability, reliability, and control of the plasma torch 14 and the components within the single enclosure 20 of the system 10. For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power cable 18. The enclosure 20 may also include vents 28 to relieve heat and/or pressure inside the system 10. Additional vents may be located on other panels of the enclosure 20.

To provide for operation of the plasma torch 14, the system 10 may include a compressor motor 30, such as a DC or AC motor that may include brushed, brushless, switched reluctance, or any other suitable type of motor, and a compressor 32. For example, the compressor 32 may include a positive displacement compressor, such as reciprocating compressor (e.g., piston-cylinder), a rotary screw compressor (e.g., helical screws to compress a gas continuously without a storage tank), or a diaphragm compressor. In certain embodiments, the system 10 may include a flow meter or sensor configured to monitor output of the compressor 32. The system 10 also may include sensors, such as a pressure sensor, a temperature sensor, or a combination thereof, to provide feedback used to adjust the motor 30, the compressor 32, power electronics 34, or a combination thereof. The power electronics 34 may be configured to condition and provide power to the torch 14 and the compressor 32, and, as discussed further below, may include a main power converter for the plasma cutting circuit, a motor power converter for the compressor motor 30, and another power converter for other components in the system 10. A fan 36 may also be included inside the system 10 to provide air circulation and cooling to the system 10. Additionally, as depicted in FIG. 2, the fan 36 may be located next to one of the vents 28 to optimize air circulation. Additional fans 36 may be included at other locations inside or outside the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, gouge, etc.), power on/off, an output current level, a gas (e.g., air) flow rate, a gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, voltage, gas flow rate, gas pressure, or other operational parameters, or a combination thereof.

The plasma torch 14 includes a handle 44, a locking trigger 46, a tip 48, a retaining cap 52, as well as an electrode inside the torch 14. The clamp 16 comprises an electrically conductive material clamping portion 54 having insulated handles 56. The power cable 18 includes a plug 58 for connection to a power source such as a wall socket or a motor-driven generator. The plug 58 may be configured to work with a variety of sockets or outlets, and the system 10 may receive different power sources, such as AC 50/60 Hz, 400 Hz, single or three phase 120V, 230V, 400V, 460V, 575V, etc.

Turning now in more detail to FIG. 2, the system 10 includes the fan 36, the gas compressor 32, a heat exchanger 60, pneumatic coupling 62, and heat sinks 64. Additionally, the power electronics 34, some of which may be mounted to a PCB as discussed further below, may include dual inductor 66, primary terminal block 68, bus capacitor 70, and transformer 72. Additionally, the system 10 may include additional inductors, terminals capacitors, transformers, or other electrical components and is not limited to the components illustrated in FIGS. 1-2.

As mentioned above, the gas compressor 32 may be a reciprocating compressor (e.g., piston-type compressor), a diaphragm compressor, or a rotary screw compressor. In the illustrated embodiment, the gas compressor 32 is a single stage reciprocating compressor. The compressor 32 may include or may be connected to the DC motor 30 that is connected to power electronics 34 inside the system 10 and that drives the compressor 32. The gas compressor 32 may be rigidly mounting inside the enclosure 20 using compressor mounts such as rubber mounts, plastic mounts, metal mounts, or any other material. The compressor mounts may be configured to dampen vibrations of the compressor or to allow slight movement of the compressor during operation.

In the illustrated embodiment, the gas compressor 32 intakes and compresses air directly from the atmosphere such as via a filter, and may use one of the vents 28 as an intake vent to enable air to flow into the compressor 32. The gas used by the compressor 32 may be a gas, such as nitrogen, argon, hydrogen, oxygen, or any combination thereof. Accordingly, the gas compressor 32 may provide a direct supply of compressed gas (e.g., air) on-demand to a desired application, such as the plasma torch 14. Thus, the torch 14 may consume air directly from the unit 12 without the air being compressed into a tank. However, alternative embodiments may include an air tank configured to store the compressed air.

To ensure reliability and performance for the system 10, various temperature sensors (e.g., thermistors) may be included inside the enclosure 20 to measure the temperature of various components. For example, the system 10 may include a temperature sensor configured to measure the temperature of the motor 30, the compressor 32, the power electronics 34, atmospheric air, and so forth. In addition to each temperature sensor, the system 10 may include control and/or monitoring logic to receive signals from the temperature sensors and perform the appropriate action or indication. For example, if the signal from one or more of the temperature sensors (e.g., thermistors) exceeds a threshold temperature or voltage for a component, then the control and monitoring logic may provide a visual warning by activating a LED or LCD 42 on the control panel 38. If the signal from a temperature sensor (e.g., thermistor) exceeds another threshold temperature or voltage and/or the signal remains above the threshold for a specific duration, then the control and monitoring logic may shutdown the system 10 or that component. The control and monitoring logic may prevent use of the system 10 until the signals from the temperature sensors fall below the threshold levels.

The system 10 may also include control circuitry to coordinate functions of the system components. For example, the system 10 may include control circuitry in the vicinity of the control panel 34. In one embodiment, the control circuitry may include a processor, memory, and software code configured to control and or coordinate operation of the system 10.

The system 10 may include cooling components such as the heat sinks 64 and may include active cooling via the fan 36. The heat sinks 64 may be mounted such that airflow from the fan 36 circulates air around the heat sinks, further enhancing the cooling capability of the heat sinks 64. As discussed above, additional fans may be included in other locations in the system 10. Similarly, additional heat sinks may be placed inside the system 10 depending on those areas that need passive cooling and/or cannot be cooled by any of the fans in the system 10. Thus, in other embodiments, the system 10 may include any number and combination of active and passive cooling components.

During operation of the system 10, a user first connects the system to a power source, such as a wall socket, via the power cable 18 and the plug 58. A user may then turn on the system 10 via the user input 40. The compressor 32, fan 36, and other components of the system 12 receive power from the power electronics 34 and begin operation after the user input is activated and the control circuitry calls for operation. A user then attaches the clamp 16 to a work piece (e.g., metal or other material) to be cut. To begin cutting the work piece, the user places the cutting torch 14 adjacent the work piece and activates the trigger 46, which may involve raising a locking mechanism to free the trigger 46 before depressing the trigger 46. Compressed gas from the gas compressor 32 passes through the heat exchanger 60 and through the torch cable 15 and out the tip 48 of the torch 14. As discussed above, a pilot current may be supplied between a moveable electrode and the nozzle of the torch 14, thus establishing a pilot arc when the moveable electrode is pushed away from the nozzle of the torch 14 by the gas supplied by the compressor 32. As the electrode moves away from the nozzle of the torch, gas flowing through the torch 14 is energized into a plasma jet which in turn transfers the arc to the work piece.

The electrical arc heats up the gas from the compressor 32, converting it to plasma that is hot enough to cut the work piece. As the user moves the torch 14 across the work piece by dragging, using a drag shield, standoff guide, or the like, the material is cut as the plasma moves through the material. The thickness of the material being cut may be limited by the power of the system 10, the output of the compressor 32, and the torch 14. In addition to supplying the plasma, the compressed gas from the compressor 32 cools the torch 14 and blows away molten material (e.g., molten metal). At the end of the cut, the user releases the trigger 46 of the torch 14. Gas may continue to flow through the torch 14 for a period of time sufficient to cool the consumables, in a state known as "postflow." The postflow cools the torch 14 and ensures that any remaining material is blown away.

Figure 3:
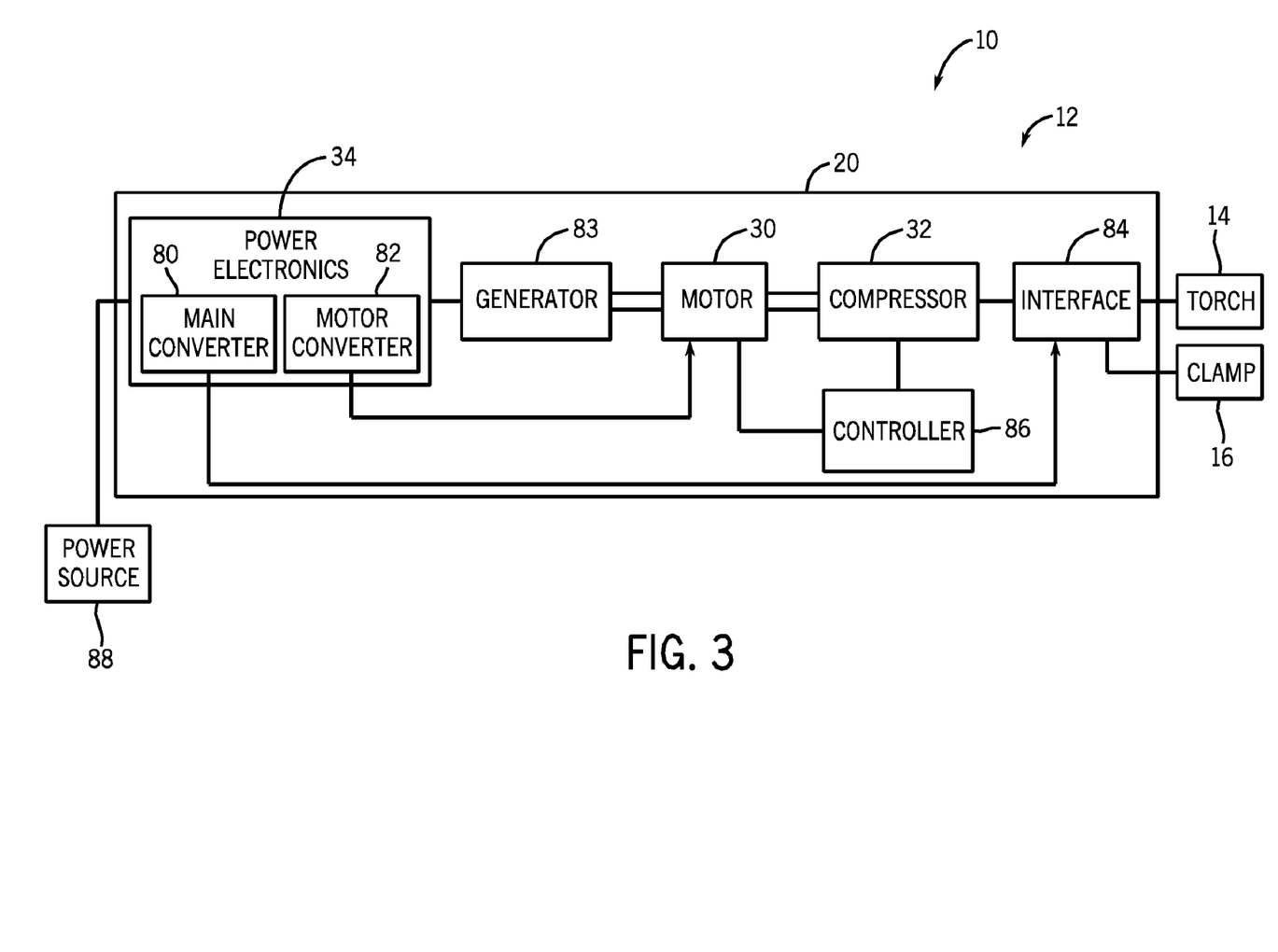
FIG. 3 is a block diagram of a plasma cutting system in accordance with an embodiment of the present invention.

FIG. 3 is a block diagram of the system 10 in accordance with an embodiment of the present invention. The power electronics 34 may include components for a main power converter 80 and a motor power converter 82. The embodiment in FIG. 3 also includes a power generator 83, the motor 30, the compressor 32, an interface 84, a compressor controller 86, the torch 14 and the clamp 16. In addition, the system 10 may be connected to an external power source 88.

The compressor 32 is driven by the motor 30, which may be controlled by the compressor controller 86. As discussed above, the motor 30 may be an electric motor, such as a DC or AC motor that may include brushed, brushless, switched, reluctance, or any other suitable type of motor, or a gas combustion engine. For example, the motor 30 may include a two-stroke or four-stroke spark-ignition engine, which includes one or more reciprocating piston in cylinder assemblies, a carburetor or fuel injection system, and so forth. Some embodiments of the system 10 may include the power generator 83 built-in or integrally disposed within the enclosure 20 of the power unit 12. Thus, the motor 30 may drive both the compressor 32 and the electrical generator 83, thereby making the power unit 12 completely portable for use in remote locations. However, other embodiments may exclude the generator 83 to reduce the size, weight, and cost of the power unit 12. Additionally, power electronics 34 provide the power management functions for the system 10. In addition to the main power converter 80 and motor power converter 82, in some embodiments the power electronics 34 may include a plasma cutting circuit, a welding circuit, an induction heating circuit, a user input/interface circuit, or a combination thereof.

The compressor controller 86 may control and monitor the speed or output of the compressor 32 and/or motor 30, and may also control and monitor the voltage, current, or other parameter of the compressor 32 and/or motor 30. The compressor controller may change these parameters in response to signals received by a user through the interface 84. For example, if a user activates or turns on the system 10 and the compressor 32 through the control panel/interface 84, the compressor controller 86 may start-up the motor 30 and the compressor 32. Similarly, a shutdown signal received from the interface 84 in response to a user turning off the system 10 would result in the compressor control 86 shutting down the motor 30 and compressor 32.

The illustrated system 10 may be connected to the power source 88, such as an AC power grid via a wall socket, as discussed above. The main power converter 80 and motor power converter 82 may convert power received from the power source 88 and provide power to various components. For example, in one embodiment, the motor power converter 82 may provide power to the motor 30 for the compressor 32. The main power converter 80 may provide power for the torch 14 and the plasma cutting circuit. Additionally, other components in the system, such as the interface 84 or controller 86 may use power from a third power converter, such as a flyback transformer, included in the power electronics 34, and/or any other components.

As will be illustrated further below in FIG. 4, to increase power density and maintain portability of the system 10, the electrical components of the main power converter 80 and the motor power converter 82 may be built onto a single printed circuit board (PCB). Thus, the layout of the components, i.e. "the footprint" of the power converters 80 and 82, is minimized to the footprint of the single PCB which may be mounted in a suitable space inside the enclosure 20. To achieve a high volumetric power density, the main power converter 80 and motor power converter 82 may use switching frequencies greater than 200 kHz. In one embodiment, the main converter 80 may produce at least 2.4 kW peak power, and the motor drive converter 82 may produce at least 300 watts peak power. The volume of the enclosure surrounding the power electronics may be about 1036 cubic inches, and the weight of the power electronics may be 26 pounds. Therefore, in such an embodiment, the combined power density of the power converters is 2.6 W/cubic inch and 103.4 W/pound.

Figure 4:
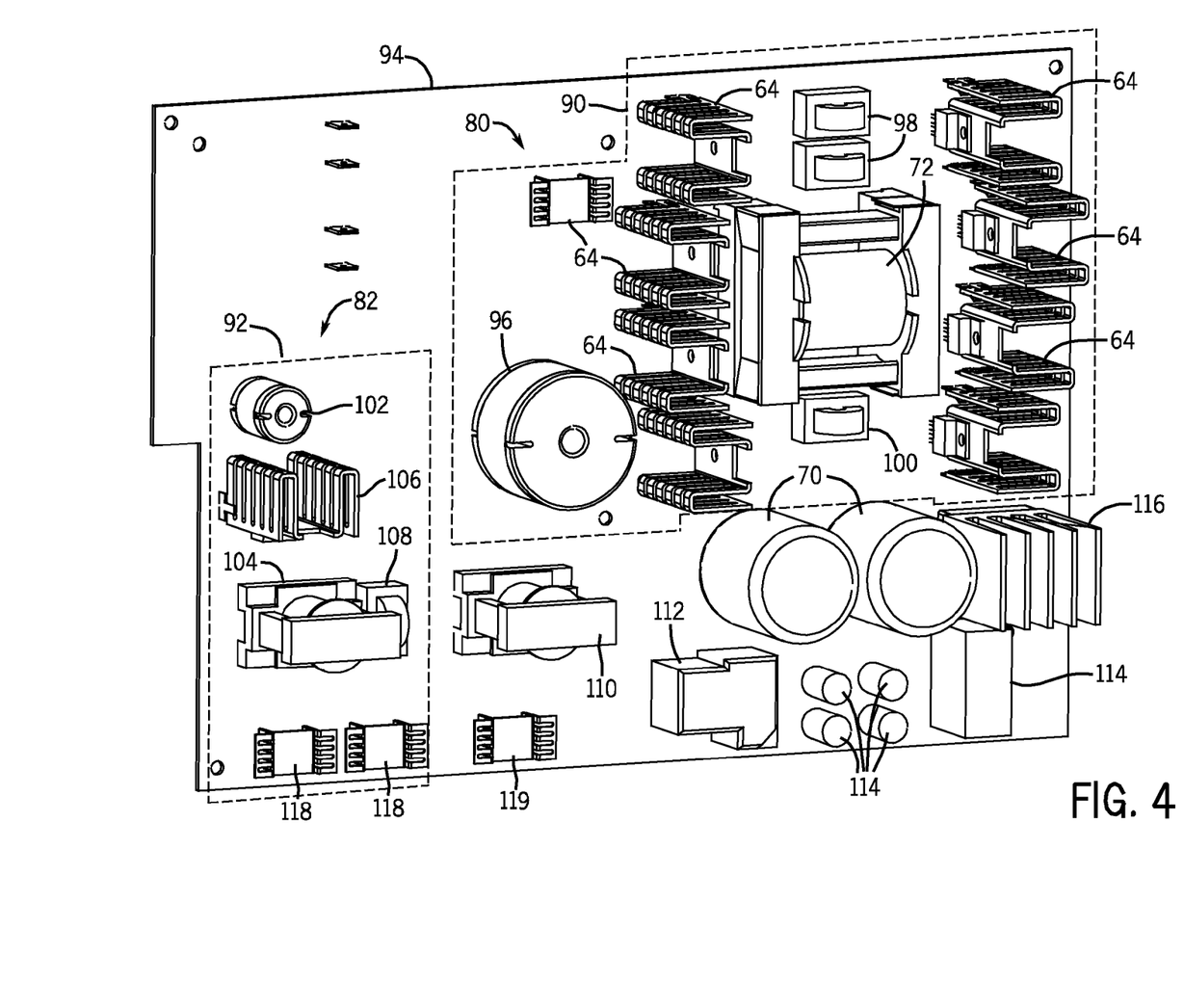
FIG. 4 is an illustration of a main power converter and a motor power converter on a printed circuit board of a plasma cutting system in accordance with an embodiment of the present invention.

FIG. 4 is an illustration of the electrical components of a main power converter 80 (dashed area 90) and a motor power converter 82 (dashed area 92) mounted on a single PCB 94 in accordance with an embodiment of the present invention. As already identified and shown in FIG. 2, the PCB includes heat sinks 64, bus capacitors 70, and transformer 72. As indicated by the dashed area 90, the components of the main converter 80 may include the main transformer 72, an output filter inductor 96, the heat sinks 64, two gate drive transformers 98, and a current sense transformer 100. As indicated by the dashed area 92, the components of the motor power converter 82 may include an output filter inductor 102, a motor drive transformer 104, heat sinks 106, gate drive transformer 108, and heat sinks 118. Also mounted on the PCB 94 are components for a third power converter that includes a flyback transformer 110. In addition to the components listed above for the power conversion functions of a plasma cutting system, additional components may be included. For example, also shown on the PCB 94 are bus capacitors 70, a relay 112, line connected filter capacitors 114, heat sink 116 for the power rectifier (not shown), and heat sink 119.

In some embodiments, the main transformer 72 and other transformers such as the gate drive transformers 98 and the current sense transformer 100 may be conventional wire-wound transformers. In other embodiments, one or more of the transformers may be foil-wound transformers in which the coil of the transformer is wound with copper foil or aluminum foil. In yet other embodiments, the transformers may be planar transformers. A planar transformer may be integrated with the PCB 94 such that coil windings are a part of the PCB 94, thus advantageously eliminating soldered components. Because of the integration with the PCB 94, the planar transformers may have a lower profile than conventional transformers, providing significant space advantageous for mounting of the PCB 94 and surrounding components. Additionally, foil-wound transformers or planar transformers may reduce weight and cost and increase reliability of the power electronics 34, yet provide high switching frequencies suitable for operation of the system 10 and other torch systems.

As discussed above, in one embodiment, the main power converter 80 and motor power converter 82 may utilize switching frequencies of at least 200 kHz. As seen in FIG. 4, the use of such high switching frequencies allows smaller magnetic components to be used and components for both the main power converter 80 and the motor power converter 82 can be mounted on the single PCB 94. The main power converter 80 provides power for the plasma cutting torch 14 and the cutting arc circuit that powers the torch; thus, the main power converter 80 may be designed to produce a relatively high current. In other embodiments, the main power converter 80 may provider power for a welding, induction heating, or any other function provided by the system 10. The motor power converter 82 provides power to the motor 30; therefore, the motor power converter may be designed to produce relatively high voltage suitable to power the motor 30 and compressor 32. The flyback transformer 102 provides a third power converter to provide power to other components in the system, such as sensors, lights, user inputs, etc.

The main power converter 80 includes gate drive transformers 98 which provide the power to activate switches or other semiconductor devices, such as devices used for controlling the main power converter 80. Additionally, the current sense transformer 100 may measure current across a line of the main power converter 80 and the output may be used to monitor or control the main power converter 80. The heat sinks 64 aid to dissipate heat and cool the components of the main power converter 80. The motor power converter 82 also includes the gate drive transformer 108 which drives a switch or other semiconductor device, such as a switch that controls the motor drive converter 82, and includes the heat sink 106 for heat dissipation and cooling.

Additional components present on the PCB 94 may not be a part of the main power converter 80 or the motor power converter 82, but may provide other functions and may be included or excluded in various embodiments. The bus capacitors 70 may store the direct current from the power rectifier. The relay 104 may aid to limit in-rush current caused by charging the capacitors on startup, and the filter capacitor 106 is connected across the line to filter noise. Additionally, the heat sinks 118 may be coupled to switches or other semiconductor devices in the system.

It should be appreciated that the high density power converters described herein are applicable to other portable systems using a compressor. For example, an engine-driven welding system that includes an engine, generator, and/or compressor, may also implement a main power converter and motor power converter on a single PCB such as illustrated in FIG. 4. Further, an induction heating system, a welding system, a plasma cutting system, or any system for which the high switching frequencies and power densities are desired may implement the main power converter and motor power converter described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a torch power unit, comprising:
   an enclosure:
   a compressor disposed in the enclosure; and
   power electronics disposed in the enclosure, wherein the power electronics comprise one or more power converters, wherein the torch power unit has a power output density of at least 2 watts per cubic inch relative to a total volume of the enclosure of the torch power unit, 80 watts per pound relative to a total weight of the torch power unit including the enclosure and its contents, or a combination thereof.

2. The system of claim 1, wherein the power output density is at least 2.5 watts per cubic inch relative to the total volume and 100 watts per pound relative to the total weight.

3. The system of claim 1, wherein the power electronics comprise a planar transformer, a foil wound transformer, or a combination thereof.

4. The system of claim 1, comprising a single circuit board supporting the power electronics including a plurality of power converters, and the plurality of power converters comprises a torch power converter and a compressor power converter.

5. The system of claim 4, wherein at least one of the plurality of power converters comprises a planar transformer integrally wound about the single circuit board supporting the power electronics.

6. The system of claim 1, wherein the one or more power converters comprise a torch power converter configured to output at least about 2 kW peak at a switching frequency of at least about 150 kHz.

7. The system of claim 6, wherein the torch power converter is configured to output at least about 2.4 kW peak at a switching frequency of at least about 200 kHz.

8. The system of claim 1, wherein the one or more power converters comprise a compressor power converter configured to output at least about 200 watts peak at a switching frequency of at least about 150 kHz.

9. The system of claim 8, wherein the compressor power converter is configured to output at least about 300 watts peak at a switching frequency of at least about 200 kHz.

10. The system of claim 1, wherein the torch power unit comprises a cutting circuit, a welding circuit, an induction heating circuit, or a combination thereof.

11. The system of claim 1, wherein the torch power unit comprises a plasma cutting power unit, the compressor is coupled to a motor, the one or more power converters comprise a plasma cutting power converter having a peak output of at least 2 kW at a switching frequency of at least 150 kHz, the one or more power converters comprise a compressor motor power converter having a peak output of at least 200 watts at a switching frequency of at least 150 KHz, the total volume of the enclosure of the torch power unit is less than about 1500 cubic inches, and the total weight of the torch power unit including the enclosure and its contents is less than about 40 pounds.

12. A power conversion assembly for a torch power unit, comprising:
a single circuit board;
a torch power converter mounted on the single circuit board; and
a motor power converter mounted on the single circuit board.

13. The power conversion assembly of claim 12, wherein the motor power converter comprises a compressor motor power converter.

14. The power conversion assembly of claim 12, comprising a third power converter mounted on the single circuit board.

15. The power conversion assembly of claim 12, wherein the torch power converter, the motor power converter, or both, comprises a planar transformer with windings integrally disposed about the single circuit board.

16. The power conversion assembly of claim 12, wherein the torch power converter, the motor power converter, or both, comprises a foil-wound transformer.

17. The power conversion assembly of claim 12, wherein the torch power converter, the motor power converter, or both, comprises at least 200 kHz switching frequencies.

18. The power conversion assembly of claim 12, wherein the torch power converter has a peak output of at least 2.4 kW.

19. A system, comprising:
a circuit board;
a first power converter mounted to the circuit board, wherein the first power converter is configured to convert power for welding, plasma cutting, induction heating, or a combination thereof; and
a second power converter mounted to the circuit board, wherein the second power converter is configured to convert power for a motor, wherein the first or second power converter comprises an output frequency of at least 150 kHz or at least one transformer that is a planar transformer or a foil wound transformer.

20. The system of claim 19, comprising the at least one transformer that is the foil transformer or the planar transformer having windings integrally disposed about the circuit board.

21. The system of claim 19, wherein the first or second power converter comprises the output frequency of at least 200 kHz.

22. The system of claim 19, wherein the first power converter has a peak output of at least 2.4 kW.

23. A method, comprising:
outputting a peak power density of greater than 2 watts per cubic inch relative to a total volume of an enclosure of a power unit, 80 watts per pound relative to a total weight of the power unit including the enclosure and its contents, or a combination thereof, wherein the power unit comprises a compressor, a motor coupled to the compressor, and power electronics all disposed in the enclosure, wherein the power electronics are configured to convert power for the motor and at least one of welding, plasma cutting, or induction heating.

24. The method of claim 23, wherein outputting the peak power density comprises converting power to produce a first peak output of at least 2 kW at a first output frequency of at least 150 kHz for at least one of welding, plasma cutting, or induction heating, wherein outputting the peak power density comprises converting power to produce a second output of at least 200 W at a second output frequency of at least 150 kHz for the motor driving the compressor.

25. A method of manufacturing a torch system, comprising:
integrating torch power electronics and compressor power electronics onto a single circuit board, wherein the torch power electronics and the compressor power electronics comprise at least one of a planar transformer or a foil-wound transformer mounted to the single circuit board for power conversion in both the torch power electronics and the compressor power electronics.

* * * * *